(12) United States Patent
Tomita

(10) Patent No.: US 6,512,637 B1
(45) Date of Patent: Jan. 28, 2003

(54) ZOOM LENS AND PHOTOGRAPHING APPARATUS

(75) Inventor: Yasuyuki Tomita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/688,107

(22) Filed: Oct. 16, 2000

(30) Foreign Application Priority Data

Oct. 19, 1999 (JP) .......................... 11-296811

(51) Int. Cl.$^7$ .............................. G02B 15/14

(52) U.S. Cl. ...................... 359/686; 359/684

(58) Field of Search ................ 359/686, 687, 359/684, 688

(56) References Cited

U.S. PATENT DOCUMENTS

| | | | |
|---|---|---|---|
| 4,099,845 A | 7/1978 | Takeshi et al. | 350/184 |
| 5,757,554 A * | 5/1998 | Fukami | 359/684 |
| 5,760,967 A * | 6/1998 | Terasawa et al. | 359/684 |
| 5,790,316 A | 8/1998 | Terasawa et al. | 359/687 |
| 5,966,246 A | 10/1999 | Yoshikawa | 359/686 |
| 5,986,820 A * | 11/1999 | Usui et al. | 359/686 |
| 6,002,528 A | 12/1999 | Tomita | 359/684 |
| 6,124,982 A * | 9/2000 | Usui | 359/686 |

FOREIGN PATENT DOCUMENTS

| | | |
|---|---|---|
| JP | 59-4686 | 1/1984 |
| JP | 10-062686 | 3/1998 |

* cited by examiner

*Primary Examiner*—Scott J. Sugarman
(74) *Attorney, Agent, or Firm*—Fitzpatrick, Cella, Harper & Scinto

(57) ABSTRACT

A zoom lens includes, in order from an object side to an image side, a first lens unit of positive refractive power, a second lens unit of negative refractive power arranged to move during a variation of magnification, a third lens unit arranged to move during a variation of magnification, and a fourth lens unit of positive refractive power, the first lens unit including a first lens subunit of negative refractive power, a second lens subunit of positive refractive power arranged to move during focusing, and a third lens subunit of positive refractive power, wherein the zoom lens satisfies the following conditions:

$$1.95 < \delta\beta1 + \delta\beta24 < 2.05$$

$$2 < |f12/f11| < 4.5$$

where $\delta\beta1$ is the ratio of a lateral magnification of the first lens unit with respect to a standard-distance object obtained when the second lens subunit is located at such a position as to focus on a minimum distance to a lateral magnification of the first lens unit with respect to the standard-distance object obtained when the second lens subunit is located at such a position as to focus on an infinite distance, $\delta\beta24$ is the ratio of a lateral magnification of a lens system composed of the second lens unit to the fourth lens unit with respect to the standard-distance object obtained when the second lens subunit is located at such a position as to focus on the minimum distance to a lateral magnification of the lens system composed of the second lens unit to the fourth lens unit with respect to the standard-distance object obtained when the second lens subunit is located at such a position as to focus on the infinite distance, f11 is the focal length of the first lens subunit, and f12 is the focal length of the second lens subunit.

10 Claims, 4 Drawing Sheets

ZOOM LENS AND PHOTOGRAPHING APPARATUS

BACKGROUND OF THE INVENTION

1. Field of the Invention

The present invention relates to a zoom lens and a photographing apparatus, and, more particularly, to a zoom lens in which the variation of an angle of view thereof due to the movement of a focusing lens is suppressed, and a photographing apparatus having such a zoom lens.

2. Description of Related Art

Heretofore, for use with a television camera, a photographic camera, a video camera or the like, there has been a demand for a zoom lens having high optical performance while having a large relative aperture and a high variable magnification ratio.

In addition to such a demand, in the case of a color television camera for broadcasting, in particular, importance is attached to operability and mobility. In response to such a requirement, the usage of a CCD (charge-coupled device) of ⅔ inch or ½ inch has become the mainstream for an image pickup device in the color television camera.

Since the CCD has an almost uniform resolution over the entire image pickup range, a zoom lens to be associated with the CCD is also required to have an almost uniform resolution from the center of an image plane to the periphery thereof. Further, with advances in high-resolution products in recent years, the high density construction of the CCD has progressed, so that the demand for high performance of zoom lenses has become stronger increasingly.

In addition, there is a great demand for a wide angle of view for zoom lenses. In recent years, some zoom lenses have a horizontal angle of view exceeding 80 degrees. In these wide-angle zoom lenses, such an arrangement has become the mainstream that the first lens unit is composed of three lens subunits of negative, positive and positive refractive powers, respectively, so as to correct the various aberrations caused by the wide angle of view, and the second lens subunit of positive refractive power is moved toward the image side during focusing from an infinitely distant object to a minimum-distance object.

In the meantime, there is such a problem that the angle of view is changed due to focusing. As one means for solving the problem, there has been proposed a system in which position signals indicative of the positions for focusing and zooming are detected and, during focusing, the zooming operation is performed in such a way as to cancel the change of the angle of view due to the focusing. However, in the proposed system, the correction for the change of the angle of view cannot be performed both at the wide-angle end and the telephoto end, so that the change of an angle of view is left uncorrected in part. At the telephoto side, where the depth of field is shallow, the change of the angle of view due to focusing is inconspicuous even if left uncorrected. However, at the wide-angel side, the change of the angle of view appears as if the zooming operation occurs. On the other hand, as has been proposed as a focusing type adapted for a wide-angle zoom lens in, for example, Japanese Patent Publication No. Sho 59-4686 (corresponding to U.S. Pat. No. 4,099,845), the above-mentioned zoom lens of the type in which the first lens unit is composed of three lens subunits of negative, positive and positive refractive powers, respectively, is known as a type in which the change of the angle of view due to focusing is small, as compared with zoom lenses of other focusing types.

Further, in Japanese Laid-Open Patent Application No. Hei 10-062686 (corresponding to U.S. Pat. No. 5,966,246), as a large-aperture, wide-angle and high-variable-magnification zoom lens having the F-number of 1.8 or thereabout and a variable magnification ratio of 10 or thereabout, there has been proposed a four-unit zoom lens which comprises four lens units, i.e., in order from the object side, a first lens unit of positive refractive power arranged to be stationary during the variation of magnification, a second lens unit of negative refractive power arranged to move during the variation of magnification, a third lens unit of positive refractive power for compensating for the shift of an image plane due to the variation of magnification, and a fourth lens unit of positive refractive power for image formation, wherein the first lens unit is composed of three lens subunits of negative, positive and positive refractive powers, respectively.

In order to make a zoom lens have a large aperture ratio (F-number of 1.5 to 1.8), a wide angle of view and a high variable magnification ratio (variable magnification ratio of 10 to 30) and have high optical performance over the entire variable magnification ratio, and in order to lessen the change of the angle of view due to focusing in the zoom lens, it is necessary to appropriately set the refractive power of each lens unit, the lens construction, the sharing of correction of aberration, the sharing of achromatism, etc.

For example, if it is intended to attain a zoom lens having high optical performance with little variation of aberration over the entire variable magnification range and the entire focusing range, having little change of an angle of view due to focusing at the wide-angle end, and having a large aperture ratio and a high variable magnification ratio, a problem arises in that the number of constituent lens elements of the zoom lens increases inevitably and, therefore, the size of the entire lens system increases.

There have been proposed a number of zoom lenses in which the first lens unit is composed of three lens subunits of negative, positive and positive refractive powers, respectively, for the purpose of realizing a wide angle of view.

For example, in Japanese Patent Publication No. Sho 59-4686, there has been proposed a focusing type adapted for a wide-angle zoom lens in which the first lens unit is composed of three lens subunits of negative, positive and positive refractive powers, respectively. However, since the positive lens subunit movable for focusing is allowed to have a refractive power relatively stronger than that of the negative lens subunit disposed before that positive lens subunit, the zoom lens is not appropriate to the attainment of high magnification, high performance and high quality. Further, although the lens construction in which the change of an angle of view due to focusing is small has been proposed, no mention has been made about the relationship between the lateral magnification of the first lens unit and the lateral magnification of the second and subsequent lens units, and the zoom lens can not be said to have a lens construction sufficient for controlling the degree of the change of the angle of view at the wide-angle end.

In addition, in a zoom lens disclosed in Japanese Laid-Open Patent Application No. Hei 10-062686, the positive lens subunit movable for focusing has a refractive power weaker than that of the negative lens unit disposed before that positive lens unit. Therefore, as has been mentioned in Japanese Patent Publication No. Sho 59-4686, the zoom lens has a lens construction which has low efficiency for focusing and which is unsuitable for the reduction in size of the entire lens system.

In order to make a zoom lens have high quality while attaining a reduction in size and weight of the entire lens system, it is necessary to appropriately set the refractive power of each lens unit and the lens construction. In order to attain a wide angle of view and a high variable magnification ratio in a zoom lens, how to balance, with respect to the entire lens system, the refractive power of each of the front lens unit, the magnification varying lens unit and the lens unit for compensating for the shift of an image plane due to the variation of magnification is an important factor. Further, in order to suppress the change of the angle of view due to focusing, it is also necessary to appropriately set the refractive powers of lens subunits included in the front lens unit and the relationship between the lateral magnification of the front lens unit and the lateral magnification of the lens units subsequent to the front lens unit.

BRIEF SUMMARY OF THE INVENTION

It is an object of the invention to provide a four-unit zoom lens which has a large aperture ratio, a wide angle of view and a high variable magnification ratio and has high optical performance while being reduced in size, and in which a change of an angle of view due to focusing is appropriately corrected and, in particular, a change of an angle of view due to focusing, which is conspicuous at the wide-angle end, is suppressed.

To attain the above object, in accordance with an aspect of the invention, there is provided a zoom lens, comprising, in order from an object side to an image side, a first lens unit of positive refractive power, a second lens unit of negative refractive power arranged to move during a variation of magnification, a third lens unit arranged to move during a variation of magnification, and a fourth lens unit of positive refractive power, the first lens unit including a first lens subunit of negative refractive power, a second lens subunit of positive refractive power arranged to move during focusing, and a third lens subunit of positive refractive power, wherein the zoom lens satisfies the following conditions:

$$1.95 < \delta\beta 1 + \delta\beta 24 < 2.05$$

$$2 < |f12/f11| < 4.5$$

where $\delta\beta 1$ is the ratio of a lateral magnification of the first lens unit with respect to a standard-distance object obtained when the second lens subunit is located at such a position as to focus on a minimum distance to a lateral magnification of the first lens unit with respect to the standard-distance object obtained when the second lens subunit is located at such a position as to focus on an infinite distance, $\delta\beta 24$ is the ratio of a lateral magnification of a lens system composed of the second lens unit to the fourth lens unit with respect to the standard-distance object obtained when the second lens subunit is located at such a position as to focus on the minimum distance to a lateral magnification of the lens system composed of the second lens unit to the fourth lens unit with respect to the standard-distance object obtained when the second lens subunit is located at such a position as to focus on the infinite distance, f11 is the focal length of the first lens subunit, and f12 is the focal length of the second lens subunit.

In accordance with a preferred aspect of the invention, in the zoom lens, the first lens subunit includes at least two negative lenses and at least one positive lens, the second lens subunit includes at least one positive lens, and the third lens subunit includes at least three positive lenses and at least one negative lens.

In accordance with another aspect of the invention, there is provided a photographing apparatus, comprising a zoom lens which comprises, in order from an object side to an image side, a first lens unit of positive refractive power, a second lens unit of negative refractive power arranged to move during a variation of magnification, a third lens unit arranged to move during a variation of magnification, and a fourth lens unit of positive refractive power, the first lens unit including a first lens subunit of negative refractive power, a second lens subunit of positive refractive power arranged to move during focusing, and a third lens subunit of positive refractive power, wherein the zoom lens satisfies the following conditions:

$$1.95 < \delta\beta 1 + \delta\beta 24 < 2.05$$

$$2 < |f12/f11| < 4.5$$

where $\delta\beta 1$ is the ratio of a lateral magnification of the first lens unit with respect to a standard-distance object obtained when the second lens subunit is located at such a position as to focus on a minimum distance to a lateral magnification of the first lens unit with respect to the standard-distance object obtained when the second lens subunit is located at such a position as to focus on an infinite distance, $\delta\beta 24$ is the ratio of a lateral magnification of a lens system composed of the second lens unit to the fourth lens unit with respect to the standard-distance object obtained when the second lens subunit is located at such a position as to focus on the minimum distance to a lateral magnification of the lens system composed of the second lens unit to the fourth lens unit with respect to the standard-distance object obtained when the second lens subunit is located at such a position as to focus on the infinite distance, f11 is the focal length of the first lens subunit, and f12 is the focal length of the second lens subunit, and a casing holding the zoom lens.

In accordance with a preferred aspect of the invention, in the zoom lens of the photographing apparatus, the first lens subunit includes at least two negative lenses and at least one positive lens, the second lens subunit includes at least one positive lens, and the third lens subunit includes at least three positive lenses and at least one negative lens.

It is to be noted that the standard-distance object mentioned above is defined as an object having a distance that is five times to ten times a minimum shooting distance.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
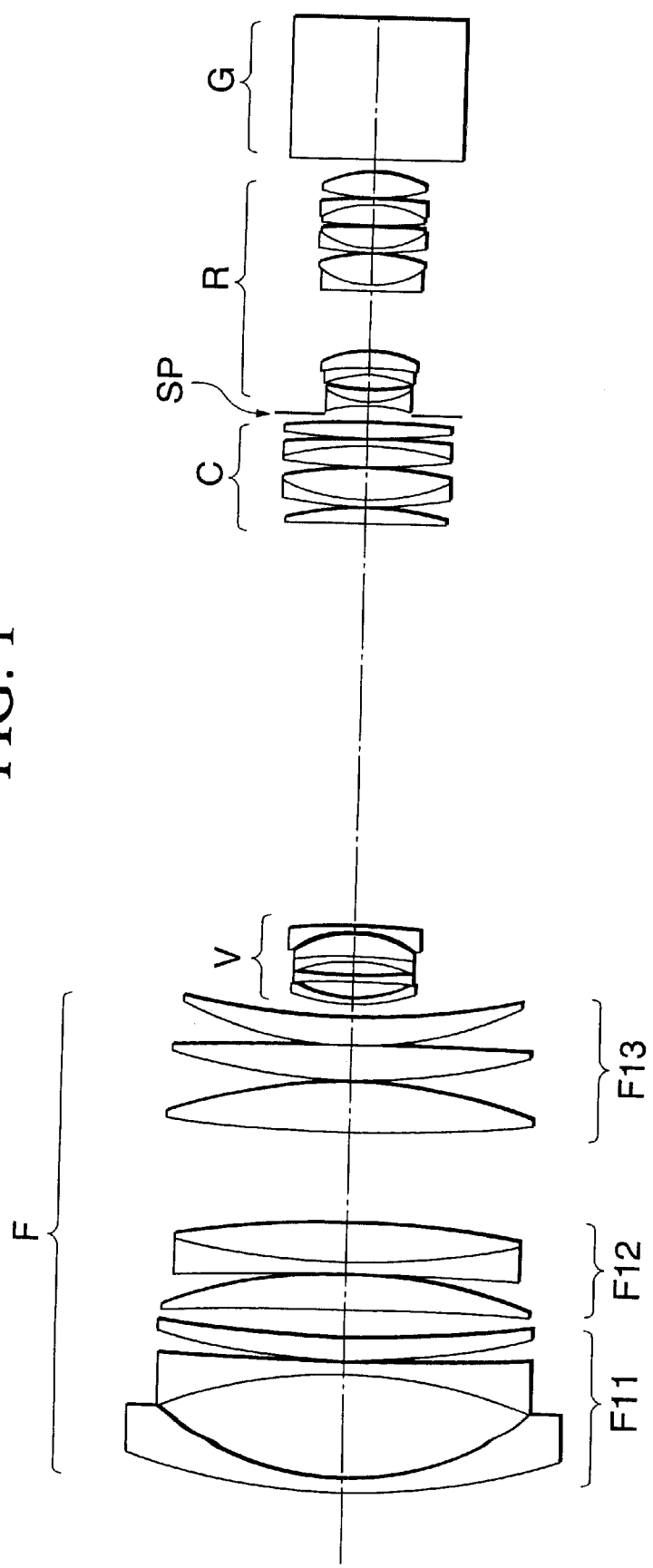
FIG. 1 is a sectional view showing the lens construction of a zoom lens at the wide-angle end according to a numerical example 1 of the invention.
Figure 2:
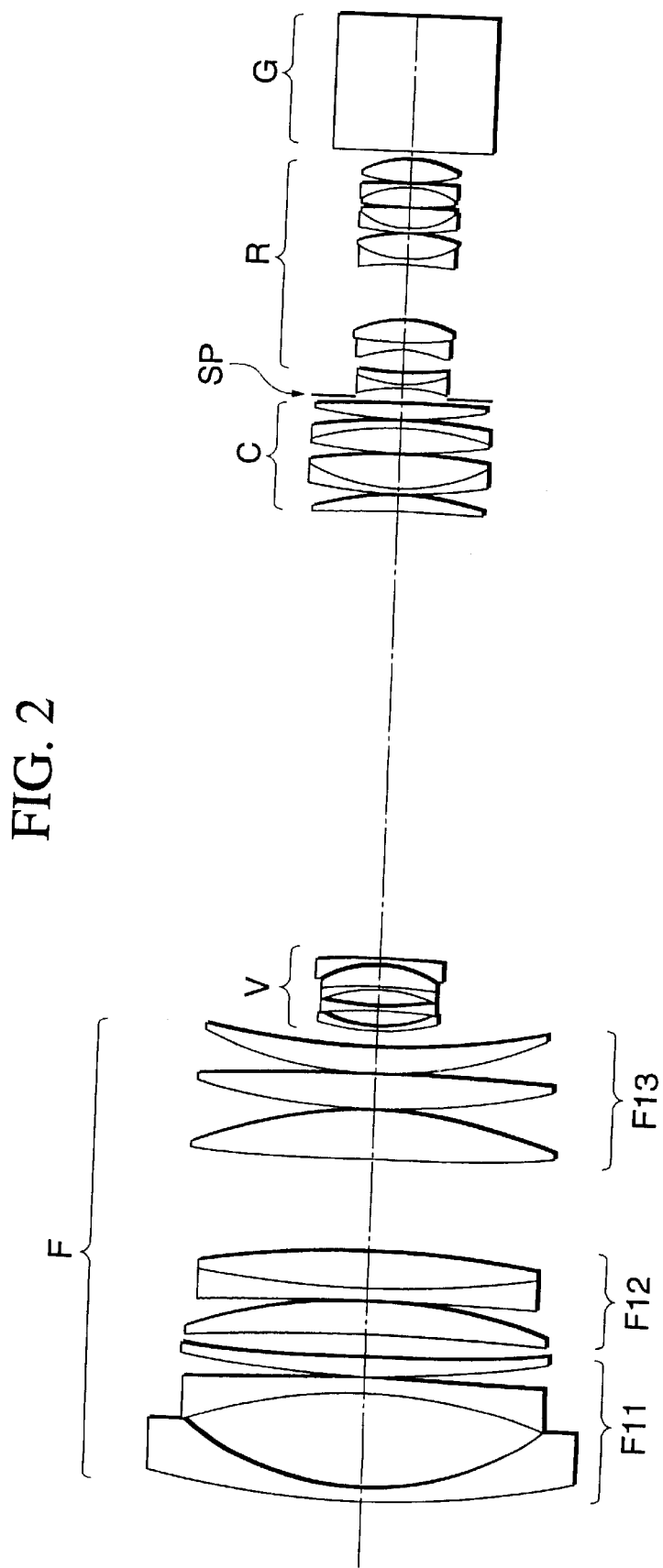
FIG. 2 is a sectional view showing the lens construction of a zoom lens at the wide-angle end according to a numerical example 2 of the invention.
Figure 3:
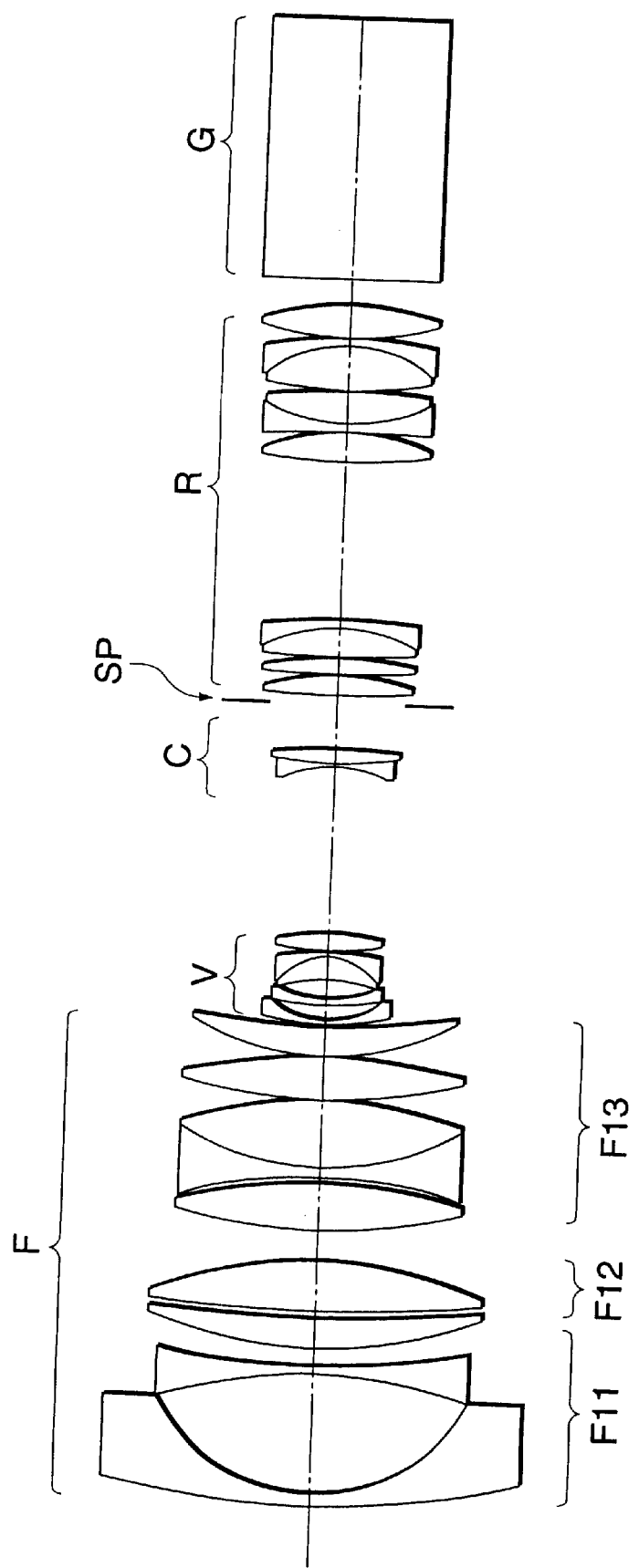
FIG. 3 is a sectional view showing the lens construction of a zoom lens at the wide-angle end according to a numerical example 3 of the invention.

FIGS. 1, 2 and 3 are sectional views showing the lens construction of zoom lenses at the wide-angle end according to numerical example 1, 2 and 3 of the invention, respectively. In FIGS. 1, 2 and 3, reference character F denotes a first lens unit (front lens unit) of positive refractive power, which is composed of a first lens subunit F11 arranged to be stationary during focusing, a second lens subunit F12 arranged to move during focusing, and a third lens subunit F13 arranged to be stationary during focusing. Then, focusing from an infinitely-distant object to a minimum-distance object is effected by moving the second lens subunit F12 from the object side toward the image side.

Reference character V denotes a variator, serving as a second lens unit, of negative refractive power for the variation of magnification. The variation of magnification from the wide-angle end to the telephoto end is effected by moving the second lens unit V monotonically toward the image side along the optical axis. The image forming magnification of the second lens unit V varies within a range including unit magnification (−1x) during the variation of magnification.

Reference character C denotes a compensator, serving as a third lens unit, which is arranged to move so as to compensate for the shift of an image plane caused by the variation of magnification. Reference character SP denotes a stop, and reference character R denotes a relay lens unit, serving as a fourth lens unit, of positive refractive power, which is arranged to be stationary during the variation of magnification. Reference character G denotes a color separation prism, an optical filter or the like, which is illustrated as a glass block in FIGS. 1, 2 and 3.

According to the present embodiment, in order to decrease a change of an angle of view occurring when an object having a given finite distance (standard distance) is photographed with different focusing positions, in particular, at the wide-angle end, the ratio of the lateral magnification of the first lens unit obtained at the minimum-distance focusing position to the lateral magnification of the first lens unit obtained at the infinite-distance focusing position and the ratio of the lateral magnification of a lens system including the second lens unit to the fourth lens unit obtained at the minimum-distance focusing position to the lateral magnification of the lens system obtained at the infinite-distance focusing position are set in such a way as to cancel each other, and the refractive powers of lens subunits included in the first lens unit are appropriately set.

Figure 4:
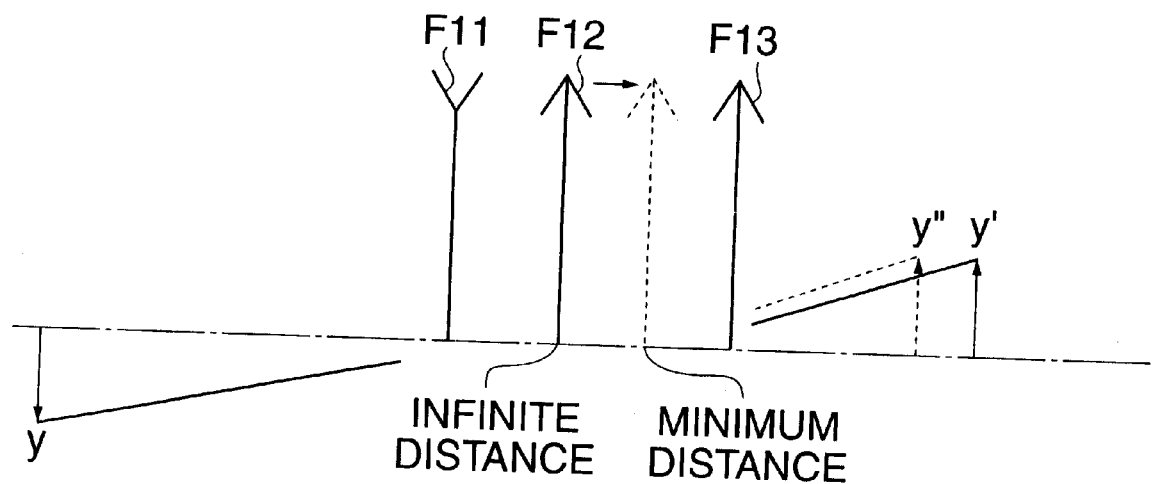
FIG. 4 is a conceptual diagram showing the relationship between an object point and an image point in the first lens unit.

FIG. 4 is a conceptual diagram showing the relationship between an object point and an image point in the first lens unit. The first lens unit is composed of three lens subunits, i.e., the first lens subunit F11 of negative refractive power arranged to be stationary during focusing and disposed on the most object side, the second lens subunit F12 of positive refractive power arranged to move during focusing, and the third lens subunit F13 of positive refractive power arranged to be stationary during focusing. Then, assuming that the dimension of an image formed by the first lens unit, when an object y having the standard distance (which is five times to ten times the minimum shooting distance) is photographed with the infinite-distance focusing position is denoted by y', and the dimension of an image formed by the first lens unit, when the object y is photographed with the minimum-distance focusing position is denoted by y'', the ratio $\delta\beta 1$ of the lateral magnification of the first lens unit obtained with the minimum-distance focusing position to the lateral magnification of the first lens unit obtained with the infinite-distance focusing position can be expressed by the equation "$\delta\beta 1 = y''/y'$". Further, as the dimension of an image formed by the first lens unit varies from the dimension y' to the dimension y'', the lateral magnification of the lens system including the second lens unit to the fourth lens unit also varies. When the ratio of the lateral magnification of the lens system including the second lens unit to the fourth lens unit obtained with the minimum-distance focusing position to the lateral magnification of the lens system obtained with the infinite-distance focusing position is denoted by $\delta\beta 24$, the zoom lens according to the present embodiment is made to satisfy the following condition:

$$1.95 < \delta\beta 1 + \delta\beta 24 < 2.05 \quad (1).$$

Further, when the focal lengths of the first lens subunit F11 and the second lens subunit F12 are denoted by f11 and f12, respectively, the zoom lens according to the present embodiment is also made to satisfy the following condition:

$$2 < |f12/f11| < 4.5 \quad (2).$$

In the first lens unit, since the second lens subunit F12 of positive refractive power moves toward the image side according to focusing from the infinite-distance focusing position to the minimum-distance focusing position, the lateral magnification of the first lens unit becomes smaller than the lateral magnification thereof obtained with the infinite-distance focusing position, so that the ratio $\delta\beta 1$ becomes a value smaller than "1". On the other hand, the ratio $\delta\beta 24$ in the variation of the lateral magnification of the lens system including the first lens unit to the fourth lens unit becomes a value larger than "1", in the way opposite to that of the ratio $\delta\beta 1$ in the variation of the lateral magnification of the first lens unit. By appropriately setting the refractive powers of the respective lens units in such a way as to satisfy the condition (1), and canceling the variation of the lateral magnification of the first lens unit with the variation of the lateral magnification of the lens system including the second lens unit to the fourth lens unit, it becomes possible to suppress a change of an angle of view due to focusing. If the lower limit of the condition (1) is exceeded, the variation of the lateral magnification of the first lens unit becomes relatively large. Such a refractive power arrangement makes the lens construction unsuitable for the attainment of high optical performance; for example, the variation of spherical aberration due to focusing increases, in particular, at the telephoto end. On the other hand, if the upper limit of the condition (1) is exceeded, the variation of the lateral magnification of the lens system including the second lens unit to the fourth lens unit becomes relatively large. In such a case, a large variation of an angle of view at the wide-angle side remains during focusing onto the minimum-distance side.

If the refractive power of the second lens subunit F12 arranged to move during focusing is weakened beyond the upper limit of the condition (2), the stroke of movement of the second lens subunit F12 becomes longer, thereby degrading the efficiency of focusing, and causing an increase in size of the entire zoom lens. On the other hand, if the refractive power of the second lens subunit F12 is strengthened beyond the lower limit of the condition (2), the variation of the various aberrations during focusing, in particular, the variation of spherical aberration, increases, thereby making it difficult to make the zoom lens have high optical performance.

The variation of the lateral magnification of the first lens unit is influenced by the setting of the refractive powers within the first lens unit, in particular, by the setting of the refractive powers of the first lens subunit F11 of negative refractive power disposed on the most object side and the second lens subunit F12 of positive refractive power arranged to move during focusing. The balance between the refractive powers of the first lens subunit F11 and the second lens subunit F12 is decided by taking into consideration the various limitations of performance, such as the setting of a variable focal length range, the limit of the diameter of a front lens member, the amount of permissible distortion, the setting of a minimum shooting distance, etc.

Further, in the zoom lens according to the present embodiment, while the image forming magnification of the second lens unit varies within a range including unit magnification (−1x), the lateral magnification β24 of the lens system including the second lens unit to the fourth lens unit behaves in different ways according to what the lateral magnification of the second lens unit is set to when the focal length at the wide-angle end is defined. In a case where such a lens construction that a range of the variation of magnification begins from the side of a more reducing system is adopted, the ratio δβ24 in the variation of the lateral magnification of the lens system, including the second lens unit to the fourth lens unit, changes to a value approaching "1". Therefore, such setting as to satisfy the required optical performance and quality and to cancel a change of the lateral magnification of the first lens unit becomes necessary. If the conditions (1) and (2) and the required optical performance and quality are satisfied, the change of an angle of view as defined as a paraxial amount changes generally to the minus side (the wide-angle-of-view side) during focusing from an infinitely distant object to a minimum-distance object. In addition, in actuality, a change of distortion must be taken into consideration. In the numerical examples 1 to 3, both a zoom lens in which the change of distortion becomes plus and a zoom lens in which the change of distortion becomes minus are included.

It is possible to compensate for a paraxial change of an angle of view by the change of distortion. However, if a large amount of the change of distortion is used for correcting the change of an angle of view, a motion of an object in the horizontal direction of an image plane becomes unnatural with respect to motions of the object in the diagonal and vertical directions of the image plane during focusing. Therefore, the amount of the change of distortion should be limited to ±1% or less.

Next, numerical data of the numerical examples 1 to 3 of the invention are shown. In the numerical data of the numerical examples 1 to 3, ri denotes the radius of curvature of the i-th lens surface, when counted from the object side, di denotes the i-th lens thickness or air separation, when counted from the object side, ni and vi respectively denote the refractive index and Abbe number of glass of the i-th lens, when counted from the object side. Further, a lens surface of the radius of curvature denoted with an asterisk is an aspheric surface.

The shape of an aspheric surface is expressed in the coordinates with an x axis in the optical axis direction and an H axis in a direction perpendicular to the optical axis, the direction in which light advances being taken as positive, by the following equation:

$$x = \frac{(1/R)H^2}{\sqrt{1-(H/R)^2}} + BH^4 + CH^6 + DH^8 + EH^{10}$$

where R is the radius of osculating sphere, and B, C, D and E are aspheric coefficients.

In addition, the minimum shooting distance, which is a focusable minimum distance, is set to 600 mm in the case of each of the numerical examples 1 and 2, and to 300 mm in the case of the numerical example 3. Further, the standard distance is set to 3.5 m in the case of each of the numerical examples 1 and 2, and to 2.0 m in the case of the numerical example 3.

NUMERICAL EXAMPLE 1 f = 7.2 − 133.2   Fno = 1:1.54 − 1.85   2ω = 74.8° − 4.7°

| | | | | | |
|---|---|---|---|---|---|
| r 1 = | 232.738 | d 1 = | 4.70 | n 1 = 1.77621 | ν 1 = 49.6 |
| r 2 = | 96.398 | d 2 = | 37.47 | | |
| r 3 = | −168.636 | d 3 = | 4.50 | n 2 = 1.77621 | ν 2 = 49.6 |
| r 4 = | 2271.325 | d 4 = | 0.15 | | |
| r 5 = | 234.750 | d 5 = | 8.43 | n 3 = 1.72311 | ν 3 = 29.5 |
| r 6 = | 437.951 | d 6 = | 9.17 | | |
| r 7 = | −2187.084 | d 7 = | 13.69 | n 4 = 1.49845 | ν 4 = 81.5 |
| r 8 = | −176.728 | d 8 = | 0.20 | | |
| r 9 = | −1581.981 | d 9 = | 4.40 | n 5 = 1.81265 | ν 5 = 25.4 |
| r10 = | 267.458 | d10 = | 14.58 | n 6 = 1.49845 | ν 6 = 81.5 |
| r11 = | −330.891 | d11 = | 33.17 | | |
| r12 = | 645.994 | d12 = | 18.25 | n 7 = 1.49845 | ν 7 = 81.5 |
| r13 = | −165.983 | d13 = | 0.15 | | |
| r14 = | 202.075 | d14 = | 12.82 | n 8 = 1.49845 | ν 8 = 81.5 |
| r15 = | −3354.399 | d15 = | 0.15 | | |
| r16 = | 125.391 | d16 = | 10.01 | n 9 = 1.62286 | ν 9 = 60.3 |
| r17 = | 243.904 | d17 = | Variable | | |
| r18 = | 83.754 | d18 = | 1.50 | n10 = 1.88815 | ν10 = 40.8 |
| r19 = | 44.623 | d19 = | 6.51 | | |
| r20 = | −207.637 | d20 = | 1.50 | n11 = 1.77621 | ν11 = 49.6 |
| r21 = | 132.315 | d21 = | 6.21 | | |
| r22 = | −55.667 | d22 = | 1.50 | n12 = 1.77621 | ν12 = 49.6 |
| r23 = | −241.746 | d23 = | 8.01 | n13 = 1.81643 | ν13 = 22.8 |
| r24 = | −38.383 | d24 = | 0.66 | | |
| r25 = | −36.410 | d25 = | 1.50 | n14 = 1.82017 | ν14 = 46.6 |
| r26 = | −296.245 | d26 = | Variable | | |
| r27 = | −89799.644 | d27 = | 5.49 | n15 = 1.50014 | ν15 = 65.0 |
| r28 = | 108.536 | d28 = | 0.20 | | |
| r29 = | 164.107 | d29 = | 2.50 | n16 = 1.84666 | ν16 = 23.8 |
| r30 = | 65.272 | d30 = | 11.58 | n17 = 1.59143 | ν17 = 61.2 |
| r31 = | −150.898 | d31 = | 0.20 | | |
| r32 = | 199.555 | d32 = | 8.20 | n18 = 1.60548 | ν18 = 60.7 |
| r33 = | −107.219 | d33 = | 2.50 | n19 = 1.85501 | ν19 = 23.9 |
| r34 = | −252.208 | d34 = | 0.20 | | |
| r35 = | 169.641 | d35 = | 5.94 | n20 = 1.48915 | ν20 = 70.2 |
| r36 = | −330.997 | d36 = | Variable | | |
| r37 = | (Stop) | d37 = | 3.58 | | |
| r38 = | −50.045 | d38 = | 1.50 | n21 = 1.73234 | ν21 = 54.7 |
| r39 = | 29.561 | d39 = | 4.00 | n22 = 1.85504 | ν22 = 23.8 |
| r40 = | 74.895 | d40 = | 6.00 | | |
| r41 = | −36.483 | d41 = | 1.80 | n23 = 1.75844 | ν23 = 52.3 |
| r42 = | −171.630 | d42 = | 6.02 | n24 = 1.73429 | ν24 = 28.5 |
| r43 = | −35.795 | d43 = | 22.50 | | |
| r44 = | −7507.517 | d44 = | 1.80 | n25 = 1.75844 | ν25 = 52.3 |
| r45 = | 30.961 | d45 = | 11.52 | n26 = 1.55098 | ν26 = 45.8 |
| r46 = | −48.500 | d46 = | 0.20 | | |
| r47 = | 108.427 | d47 = | 1.80 | n27 = 1.83932 | ν27 = 37.2 |
| r48 = | 32.468 | d48 = | 7.84 | n28 = 1.48915 | ν28 = 70.2 |
| r49 = | −158.725 | d49 = | 0.20 | | |
| r50 = | 163.781 | d50 = | 7.68 | n29 = 1.49845 | ν29 = 81.5 |
| r51 = | −34.406 | d51 = | 1.80 | n30 = 1.81264 | ν30 = 25.4 |
| r52 = | −222.938 | d52 = | 0.50 | | |
| r53 = | 82.508 | d53 = | 8.68 | n31 = 1.48915 | ν31 = 70.2 |
| r54 = | −38.713 | d54 = | 5.00 | | |

-continued

| | | | | | | |
|---|---|---|---|---|---|---|
| r55 = | ∞ | d55 = | 50.00 | n32 = 1.51825 | ν32 = 64.2 |
| r56 = | ∞ | | | | |

*: Aspheric Surface

| Variable | Focal Length | | |
|---|---|---|---|
| Separation | 28.89 | 50.00 | 131.14 |
| d17 | 5.21 | 75.21 | 100.79 |
| d26 | 148.88 | 60.03 | 6.03 |
| d36 | 2.15 | 21.00 | 49.42 |

Shape of Aspheric Surface:

r28:
R = −108.536    B = 2.229 × $10^{-7}$    C = 9.266 × $10^{-12}$
D = 1.225 × $10^{-14}$    E = −8.232 × $10^{-18}$

NUMERICAL EXAMPLE 2 f = 7.0 − 196    Fno = 1:1.6 − 2.55    2ω = 76.3° − 3.2°

| r 1 = | 381.900 | d 1 = | 4.70 | n 1 = 1.77621 | ν 1 = 49.6 |
|---|---|---|---|---|---|
| r 2 = | 108.520 | d 2 = | 37.22 | | |
| r 3 = | −182.503 | d 3 = | 4.50 | n 2 = 1.77621 | ν 2 = 49.6 |
| r 4 = | −2189.115 | d 4 = | 0.15 | | |
| r 5 = | 273.408 | d 5 = | 9.01 | n 3 = 1.72311 | ν 3 = 29.5 |
| r 6 = | 561.565 | d 6 = | 10.31 | | |
| r 7 = | −722.154 | d 7 = | 12.90 | n 4 = 1.49845 | ν 4 = 81.5 |
| r 8 = | −180.345 | d 8 = | 0.20 | | |
| r 9 = | −3776.668 | d 9 = | 4.40 | n 5 = 1.81265 | ν 5 = 25.4 |
| r10 = | 320.179 | d10 = | 14.79 | n 6 = 1.49845 | ν 6 = 81.5 |
| r11 = | −378.583 | d11 = | 37.70 | | |
| r12 = | 972.561 | d12 = | 19.47 | n 7 = 1.45720 | ν 7 = 90.3 |
| r13 = | −170.530 | d13 | 0.15 | | |
| r14 = | 266.396 | d14 = | 14.12 | n 8 = 1.43496 | ν 8 = 95.1 |
| r15 = | −843.405 | d15 = | 0.15 | | |
| r16 = | 138.838 | d16 = | 10.84 | n 9 = 1.62286 | ν 9 = 60.3 |
| r17 = | 276.164 | d17 = | Variable | | |
| r18 = | 83.608 | d18 = | 1.50 | n10 = 1.88815 | ν10 = 40.8 |
| r19 = | 45.672 | d19 = | 6.75 | | |
| r20 = | −151.723 | d20 = | 1.50 | n11 = 1.77621 | ν11 = 49.6 |
| r21 = | 130.863 | d21 = | 6.94 | | |
| r22 = | −52.465 | d22 = | 1.50 | n12 = 1.77621 | ν12 = 49.6 |
| r23 = | −192.560 | d23 = | 7.46 | n13 = 1.85501 | ν13 = 23.9 |
| r24 = | −40.008 | d24 = | 0.68 | | |
| r25 = | −37.738 | d25 = | 1.50 | n14 = 1.77621 | ν14 = 49.6 |
| r26 = | −296.245 | d26 = | Variable | | |
| r27 = | −498.813 | d27 = | 6.49 | n15 = 1.50014 | ν15 = 65.0 |
| r28 = | −88.822 | d28 = | 0.20 | | |
| r29 = | 163.787 | d29 = | 2.50 | n16 = 1.65223 | ν16 = 33.8 |
| r30 = | 69.537 | d30 = | 13.49 | n17 = 1.60548 | ν17 = 60.7 |
| r31 = | −168.509 | d31 = | 0.20 | | |
| r32 = | 177.750 | d32 = | 10.38 | n18 = 1.60548 | ν18 = 60.7 |
| r33 = | −102.114 | d33 = | 2.50 | n19 = 1.85504 | ν19 = 23.8 |
| r34 = | −224.026 | d34 = | 0.20 | | |
| r35 = | 154.654 | d35 = | 6.59 | n20 = 1.48915 | ν20 = 70.2 |
| r36 = | −362.351 | d36 = | Variable | | |
| r37 = | (Stop) | d37 = | 3.60 | | |
| r38 = | −57.131 | d38 = | 1.50 | n21 = 1.73234 | ν21 = 54.7 |
| r39 = | 45.343 | d39 = | 4.38 | n22 = 1.85504 | ν22 = 23.8 |
| r40 = | 85.530 | d40 = | 9.88 | | |
| r41 = | −40.170 | d41 = | 1.80 | n23 = 1.75844 | ν23 = 52.3 |
| r42 = | 100.382 | d42 = | 9.27 | n24 = 1.73429 | ν24 = 28.5 |
| r43 = | −37.879 | d43 = | 22.50 | | |
| r44 = | −183.382 | d44 = | 1.80 | n25 = 1.77621 | ν25 = 49.6 |
| r45 = | 35.210 | d45 = | 10.16 | n26 = 1.51976 | ν26 = 52.4 |
| r46 = | −44.220 | d46 = | 0.20 | | |
| r47 = | 160.916 | d47 = | 1.80 | n27 = 1.83932 | ν27 = 37.2 |
| r48 = | 33.610 | d48 = | 7.81 | n28 = 1.48915 | ν28 = 70.2 |
| r49 = | −137.353 | d49 = | 0.20 | | |
| r50 = | 312.530 | d50 = | 7.61 | n29 = 1.49845 | ν29 = 81.5 |
| r51 = | −31.520 | d51 = | 1.80 | n30 = 1.81264 | ν30 = 25.4 |

-continued

| | | | | | |
|---|---|---|---|---|---|
| r52 = | −103.844 | d52 = | 0.50 | | |
| r53 = | 84.714 | d53 = | 7.79 | n31 = 1.48915 | ν31 = 70.2 |
| r54 = | −40.244 | d54 = | 5.00 | | |
| r55 = | ∞ | d55 = | 50.00 | n32 = 1.51825 | ν32 = 64.2 |
| r56 = | ∞ | | | | |

*: Aspheric Surface

| Variable | Focal Length | | |
|---|---|---|---|
| Separation | 7.00 | 40.44 | 196.00 |
| d17 | 6.39 | 101.39 | 135.57 |
| d26 | 180.28 | 68.14 | 3.21 |
| d36 | 2.15 | 19.29 | 50.05 |

Shape of Aspheric Surface:

r28:
R = −88.822    B = 2.228 × $10^{-7}$    C = 3.992 × $10^{-11}$
D = 9.229 × $10^{-14}$    E = −3.296 × $10^{-17}$

NUMERICAL EXAMPLE 3 f = 5 − 50    Fno = 1:1.84 − 2.20    2ω = 95.5° − 12.6°

| r 1 = | 213.485* | d 1 = | 2.30 | n 1 = 1.77621 | ν 1 = 49.6 |
|---|---|---|---|---|---|
| r 2 = | 32.596 | d 2 = | 22.45 | | |
| r 3 = | −92.715 | d 3 = | 1.90 | n 2 = 1.77621 | ν 2 = 49.6 |
| r 4 = | 149.675 | d 4 = | 3.33 | | |
| r 5 = | 80.432 | d 5 = | 5.69 | n 3 = 1.81264 | ν 3 = 25.4 |
| r 6 = | 253.546 | d 6 = | 1.63 | | |
| r 7 = | 291.540 | d 7 = | 9.56 | n 4 = 1.62286 | ν 4 = 60.3 |
| r 8 = | −75.540 | d 8 = | 6.20 | | |
| r 9 = | 101.805 | d 9 = | 9.09 | n 5 = 1.45720 | ν 5 = 90.3 |
| r10 = | −94.777 | d10 = | 1.18 | | |
| r11 = | −83.573 | d11 = | 2.00 | n 6 = 1.80642 | ν 6 = 35.0 |
| r12 = | 48.306 | d12 = | 13.15 | n 7 = 1.49845 | ν 7 = 81.5 |
| r13 = | −84.619 | d13 = | 0.20 | | |
| r14 = | 99.950 | d14 = | 8.33 | n 8 = 1.62033 | ν 8 = 63.3 |
| r15 = | −112.886 | d15 = | 0.20 | | |
| r16 = | 46.834 | d16 = | 5.55 | n 9 = 1.73234 | ν 9 = 54.7 |
| r17 = | 119.468 | d17 = | Variable | | |
| r18 = | 44.508 | d18 = | 0.80 | n10 = 1.88815 | ν10 = 40.8 |
| r19 = | 14.003 | d19 = | 3.29 | | |
| r20 = | 74.610 | d20 = | 0.80 | n11 = 1.83945 | ν11 = 42.7 |
| r21 = | 18.213 | d21 = | 4.09 | | |
| r22 = | −26.639 | d22 = | 4.39 | n12 = 1.81264 | ν12 = 25.4 |
| r23 = | −10.631 | d23 = | 0.80 | n13 = 1.88815 | ν13 = 40.8 |
| r24 = | −57.454 | d24 = | 0.20 | | |
| r25 = | 44.409 | d25 = | 3.46 | n14 = 1.57829 | ν14 = 41.5 |
| r26 = | −41.153 | d26 = | Variable | | |
| r27 = | −23.937 | d27 = | 0.80 | n15 = 1.77621 | ν15 = 49.5 |
| r28 = | 57.157 | d28 = | 2.80 | n16 = 1.85496 | ν16 = 23.8 |
| r29 = | −116.746 | d29 = | Variable | | |
| r30 = | (Stop) | d30 = | 1.40 | | |
| r31 = | 189.661 | d31 = | 3.65 | n17 = 1.64419 | ν17 = 34.5 |
| r32 = | −51.644 | d32 = | 0.20 | | |
| r33 = | 181.249 | d33 = | 3.20 | n18 = 1.48915 | ν18 = 70.2 |
| r34 = | −93.616 | d34 = | 0.20 | | |
| r35 = | 99.207 | d35 = | 5.85 | n19 = 1.51976 | ν19 = 52.4 |
| r36 = | −30.083 | d36 = | 1.30 | n20 = 1.88845 | ν20 = 40.8 |
| r37 = | −237.177 | d37 = | 31.10 | | |
| r38 = | 108.969 | d38 = | 5.71 | n21 = 1.48915 | ν21 = 70.2 |
| r39 = | −39.063 | d39 = | 0.20 | | |
| r40 = | −180.195 | d40 = | 1.40 | n22 = 1.81078 | ν22 = 40.9 |
| r41 = | 29.190 | d41 = | 6.14 | n23 = 1.48915 | ν23 = 70.2 |
| r42 = | −207.934 | d42 = | 0.20 | | |
| r43 = | 66.112 | d43 = | 8.99 | n24 = 1.48915 | ν24 = 70.2 |
| r44 = | −23.338 | d44 = | 1.50 | n25 = 1.88815 | ν25 = 40.8 |
| r45 = | −81.042 | d45 = | 0.20 | | |

-continued

| | | | |
|---|---|---|---|
| r46 = 63.594 | d46 = 6.32 | n26 = 1.48915 | ν26 = 70.2 |
| r47 = −46.878 | d47 = 5.00 | | |
| r48 = ∞ | d48 = 50.00 | n27 = 1.51825 | ν27 = 64.2 |
| r49 = ∞ | | | |

*: Aspheric Surface

| Variable | Focal Length | | |
|---|---|---|---|
| Separation | 5.00 | 16.75 | 50.00 |
| d17 | 0.52 | 25.97 | 36.66 |
| d26 | 32.93 | 5.72 | 4.38 |
| d29 | 9.00 | 10.76 | 1.41 |

Shape of Aspheric Surface:

r 1:
R = 213.485   B = 8.013 × $10^{-7}$   C = −1.005 × $10^{-10}$
D = −1.302 × 10−15   E = −8.780 × $10^{-18}$

Further, the values of the factors of the above conditions, the focal length of each lens subunit or lens unit, and a change of the lateral magnification in each of the numerical examples 1 to 3 are listed in the following tables.

In the following tables, f1 denotes the focal length of the first lens unit, f11, f12 and f13 are the focal lengths of the first lens subunit, the second lens subunit and the third lens subunit, respectively, which constitute the first lens unit, β1 denotes the lateral magnification of the first lens unit, β24 denotes the lateral magnification of the lens system including the second lens unit to the fourth lens unit, βw denotes the lateral magnification of the entire zoom lens at the wide-angle end, which is obtained by the product of the lateral magnification β1 and the lateral magnification β24, δβw denotes the ratio of the lateral magnification βw obtained with the minimum-distance focusing position to the lateral magnification βw obtained with the infinite-distance focusing position, and δdist. denotes the percentage of a change of distortion in the horizontal direction at the minimum-distance focusing position with respect to that at the infinite-distance focusing position. A rate of change of an angle of view is a value obtained by adding, to the ratio δβw, the percentage δdist. of a change of distortion in the horizontal direction.

| Numerical Example 1 | | |
|---|---|---|
| | Infinite Distance | Minimum Distance |
| f11 | −114.0648 | |
| f12 | 416.4847 | |
| f13 | 114.1522 | |
| f1 | 102.5823 | 90.5984 |
| β1 | −0.0292 | −0.0257 |
| δβ1 | | 0.8812 |
| β24 | 0.0685 | 0.0771 |
| δβ24 | | 1.1251 |
| βw | −0.00200 | −0.00198 |
| ββw | | −0.86% |
| δdist. | | 0.28% |

| Numerical Example 2 | | |
|---|---|---|
| | Infinite Distance | Minimum Distance |
| f11 | −123.6395 | |
| f12 | 455.0020 | |
| f13 | 133.3908 | |
| f1 | 122.0926 | 106.1814 |
| β1 | −0.0348 | −0.0302 |
| δβ1 | | 0.8671 |
| β24 | 0.0558 | 0.0635 |
| δβ24 | | 1.1378 |
| βw | −0.00194 | −0.00192 |
| δβw | | −1.35% |
| δdist. | | −0.29% |

| Numerical Example 3 | | |
|---|---|---|
| | Infinite Distance | Minimum Distance |
| f11 | −34.5343 | |
| f12 | 97.2933 | |
| f13 | 46.8503 | |
| f1 | 27.6000 | 26.0457 |
| β1 | −0.0137 | −0.0129 |
| δβ1 | | 0.9434 |
| β24 | 0.1795 | 0.1894 |
| δβ24 | | 1.0548 |
| βw | −0.00246 | −0.00245 |
| δβw | | −0.49% |
| δdist. | | 0.00% |

| | Numerical Example | | |
|---|---|---|---|
| | 1 | 2 | 3 |
| Condition (1) | 2.0063 | 2.0049 | 1.9982 |
| Condition (2) | 3.7 | 3.7 | 2.8 |
| Rate of Change of Angle of View | −0.58% | −1.63% | −0.49% |

According to the present embodiment, in the so-called four-unit zoom lens, the first lens unit is composed of three lens subunits, i.e., a first lens subunit of negative refractive power arranged to be stationary during focusing, a second lens subunit of positive refractive power arranged to move during focusing, and a third lens subunit of positive refractive power arranged to be stationary during focusing, and the refractive powers of the first lens unit and the lens system including the second lens unit to the fourth lens unit are set appropriate. Accordingly, a change of the lateral magnification caused by the movement of the second lens subunit during focusing is canceled, so that it is possible to lessen a change of an angle of view due to focusing. Further, it is possible to attain a small-sized and high-performance zoom lens having such a large aperture as the F-number of 1.5 to 1.8 or thereabout and having such a high variable magnification ratio as the magnification of 10 to 30 or thereabout.

Figure 5:
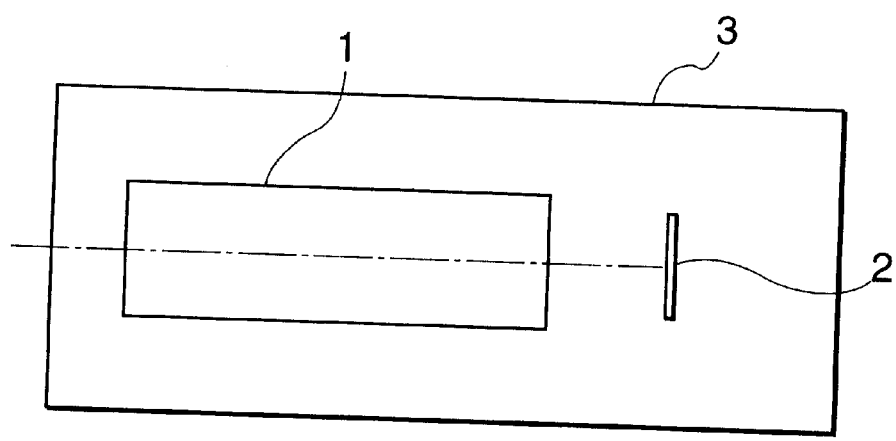
FIG. 5 is a schematic diagram showing the arrangement of a photographing apparatus having the zoom lens according to the invention.

Next, a photographing apparatus having a zoom lens as described above, according to another embodiment of the invention, will be described with reference to FIG. 5, which is a schematic diagram showing the photographing apparatus. In FIG. 5, reference numeral 1 denotes a photographing optical system using a zoom lens according to the embodiment of the invention, reference numeral 2 denotes a photoelectric conversion means such as a CCD, and reference numeral 3 denotes a photographing apparatus body (casing). By applying the zoom lens according to the embodiment of the invention to the photographing optical system of the photographing apparatus, as described in the foregoing, it is possible to realize a photographing apparatus which is compact and has high optical performance.

What is claimed is:

1. A zoom lens comprising, in order from an object side to an image side:

a first lens unit of positive refractive power;

a second lens unit of negative refractive power arranged to move during variation of magnification;

a third lens unit arranged to move during variation of magnification; and a fourth lens unit of positive refractive power, said first lens unit including a first lens subunit of negative refractive power, a second lens subunit of positive refractive power arranged to move during focusing, and a third lens subunit of positive refractive power, wherein said zoom lens satisfies the following conditions:

$$1.95 < \delta\beta1 + \delta\beta24 < 2.05$$

$$2 < |f12/f11| < 4.5$$

where $\delta\beta1$ is the ratio of a lateral magnification of said first lens unit with respect to a standard-distance object obtained when said second lens subunit is located at such a position as to focus on a minimum distance to a lateral magnification of said first lens unit with respect to the standard-distance object obtained when said second lens subunit is located at such a position as to focus on an infinite distance, $\delta\beta24$ is the ratio of a lateral magnification of a lens system composed of said second lens unit to said fourth lens unit with respect to the standard-distance object obtained when said second lens subunit is located at such a position as to focus on the minimum distance to a lateral magnification of said lens system composed of said second lens unit to said fourth lens unit with respect to the standard-distance object obtained when said second lens subunit is located at such a position as to focus on the infinite distance, f11 is the focal length of said first lens subunit, and f12 is the focal length of said second lens subunit.

2. A zoom lens according to claim 1, wherein said first lens subunit includes at least two negative lenses and at least one positive lens, said second lens subunit includes at least one positive lens, and said third lens subunit includes at least three positive lenses and at least one negative lens.

3. A photographing apparatus comprising: a zoom lens according to claim 1; and a casing holding said zoom lens.

4. A photographing apparatus according to claim 3, wherein said first lens subunit includes at least two negative lenses and at least one positive lens, said second lens subunit includes at least one positive lens, and said third lens subunit includes at least three positive lenses and at least one negative lens.

5. A zoom lens according to claim 1, wherein the following condition is satisfied at the wide-angle end:

$$1.95 < \delta\beta + \delta\beta24 < 2.05.$$

6. A zoom lens comprising, in order from an object side to an image side:

a first lens unit of positive refractive power;

a second lens unit of negative refractive power arranged to move during a variation of magnification;

a third lens unit arranged to move during a variation of magnification; and a fourth lens unit of positive refractive power, said first lens unit including a first lens submit of negative refractive power, a second lens submit of positive refractive power arranged to move during focusing, and a third lens submit of positive refractive power, wherein said zoom lens satisfies the following conditions:

a direction of a variation of magnification of $\delta \beta24$ is a direction that cancels a direction of a varition of magnification of $\delta \beta1$; and $$2 < |f12/f11| < 4.5$$

where $\delta\beta1$ is the ratio of a lateral magnification of said first lens unit with respect to a standard-distance object obtained when said second lens subunit is located at such a position as to focus on a minimum distance to a lateral magnification of said first lens unit with respect to the standard-distance object obtained when said second lens submit is located at such a position as to focus on an infinite distance, $\delta\beta24$ is the ratio of a lateral magnification of a lens system composed of said second lens unit to said fourth lens unit with respect to the standard-distance object obtained when said second lens submit is located at such a position as to focus on the minimum distance to a lateral magnification of said lens system composed of said second lens unit to said fourth lens unit with respect to the standard-distance object obtained when said second lens submit is located at such a position as to focus on the infinite distance, f11 is the focal length of said first lens subunit, and f12 is the focal length of said second lens submit.

7. A zoom lens according to claim 6, wherein the following condition is satisfied at the wide-angle end:

$$1.95 < \delta\beta + \delta\beta24 < 2.05.$$

8. A zoom lens according to claim 6, wherein said first lens subunit includes at least two negative lenses and at least one positive lens, said second lens subunit includes at least two positive lens, and said third lens subunit includes at least three positive lenses and at least one negative lens.

9. A photographing apparatus comprising:

a zoom lens according to claim 6; and a casing holding said zoom lens.

10. A photographing apparatus according to claim 6, wherein said first lens subunit includes at least two negative lenses and at least one positive lens, said second lens subunit includes at least one positive lens, and said third lens subunit includes at least three positive lenses and at least one negative lens.

* * * * *

UNITED STATES PATENT AND TRADEMARK OFFICE
CERTIFICATE OF CORRECTION

PATENT NO.     : 6,512,637 B1
DATED          : January 28, 2003
INVENTOR(S)    : Yasuyuki Tomita Page 1 of 1

It is certified that error appears in the above-identified patent and that said Letters Patent is hereby corrected as shown below:

Column 5,
Lines 64 and 67, "position" should read -- position, --.

Column 6,
Line 5, "y"/y"""  should read -- y"/y' --.

Column 8,
Line 45, "r28=108.536" should read -- r28=-108.536∗ --.

Column 9,
Line 35, "d13" should read -- d13= --.
Line 47, "r28=-88.822" should read -- r28=-88.822∗ --.

Column 11,
Line 17, "10-15" should read -- $10^{-15}$ --.
Line 64, "ββw" should read -- δβw --.

Column 12,
Line 11, "0. 8671" should read -- 0.8671 --.

Column 13,
Lines 14 and 15, "during" should read -- during a --.

Column 14,
Lines 13, 14, 16, 28, 33 and 37, "submit" should read -- subunit --.
Line 40, "submit." should read -- subunit. --.

Signed and Sealed this

Seventh Day of October, 2003

JAMES E. ROGAN
*Director of the United States Patent and Trademark Office*